N. Boardman,
Sawing Shingles,
Nº 24,277. Patented June 7, 1859.
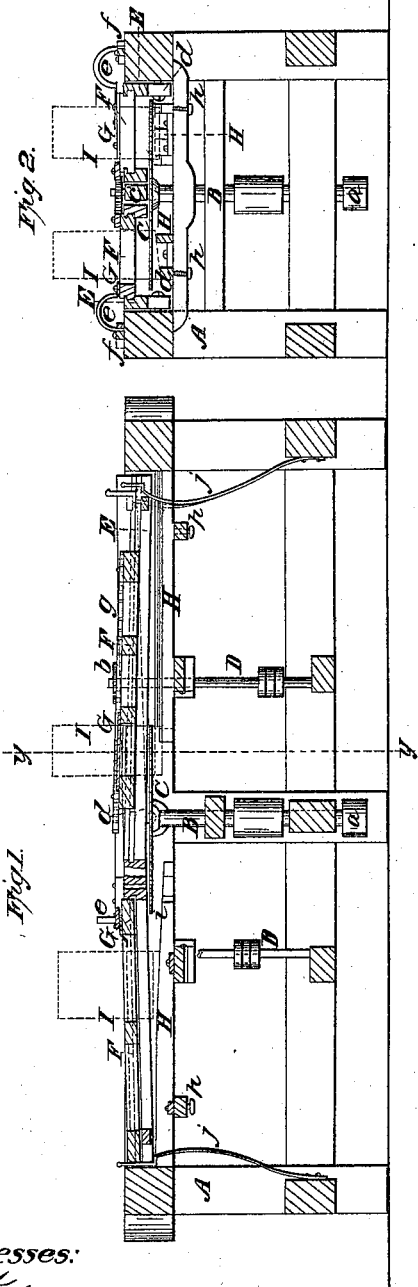
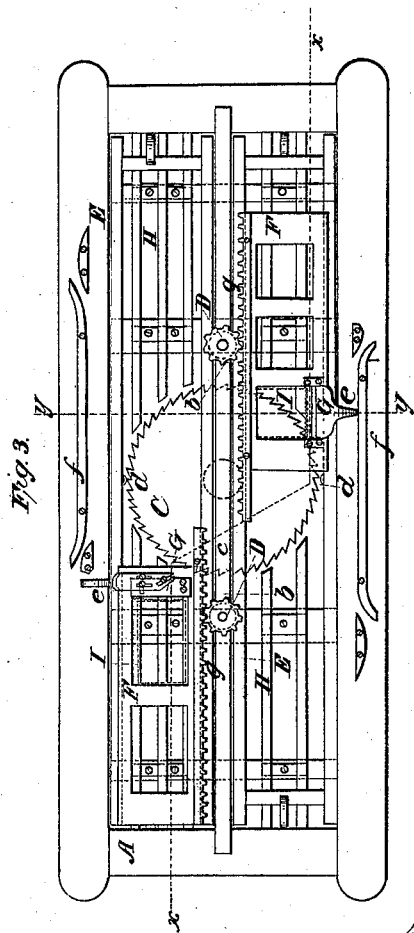
Witnesses:
Inventor:

UNITED STATES PATENT OFFICE.

N. BOARDMAN, OF FOND DU LAC, WISCONSIN.

METHOD OF SAWING SHINGLES FROM THE BOLT.

Specification of Letters Patent No. 24,277, dated June 7, 1859.

*To all whom it may concern:*

Be it known that I, N. BOARDMAN, of Fond du Lac, in the county of Fond du Lac and State of Wisconsin, have invented a new and Improved Shingle-Machine; and I do hereby declare that the following is a full, clear, and exact description of the same, reference being had to the annexed drawings, making a part of this specification, in which—

Figure 1, is a longitudinal vertical section of my invention taken in the line $x$, $x$, Fig. 3. Fig. 2, is a transverse vertical section of ditto, taken in the line $y$, $y$, Figs. 1 and 3. Fig. 3, is a plan or top view of ditto.

Similar letters of reference indicate corresponding parts in the several figures.

This invention relates to certain improvements in that class of shingle machines in which a circular saw is used to cut the shingles from the bolt.

The invention consists in using in connection with a circular saw, reciprocating bolt carriages, self-acting adjustable dogs and movable or adjustable carriage tracks, arranged to operate as hereinafter fully shown and described, whereby shingles may be sawed simultaneously from two separate bolts by one and the same saw, and the machine rendered automatic in its operation throughout.

To enable those skilled in the art to fully understand and construct my invention I will proceed to describe it.

A, represents a rectangular framing, in which there is placed centrally a vertical shaft B, having a circular saw C, on its upper end. To the lower end of the shaft B, a driving crank or pulley $a$, is attached and from the saw shaft B, two vertical shafts D, D, are driven alternately by cross and straight belts so as to cause said shafts to have a reciprocating rotating movement, that is to say, to rotate in one direction, for a time and then rotate in an opposite direction, any proper belt shipper being used for shifting the belts. On the upper ends of each shaft D, D, a pinion $b$, is placed, said pinions being above a longitudinal central bar $c$, on the framing A, which bar serves as upper bearings for the shafts D, D. In the upper part of the framing A, there are two tracks or guide frames E, E. These tracks or frames are placed one at each side of the longitudinal bar $c$, and are attached to the framing by pivots $d$, at their centers, the tracks or frames being allowed to work on their pivots to a certain extent as will be presently explained.

In each track or guide frame E, a bolt carriage F, is placed and allowed to slide freely back and forth. These bolt carriages are each provided with a dog G, said dogs being adjusted to the carriages so as to slide thereon and having a spring $e$, attached or connected to their outer ends, said springs bearing against guides $f$, attached permanently to the side bars or sills at the upper part of the framing as shown clearly in Fig. 3. To the inner side of each carriage F, a rack $g$, is attached into which the pinions $b$, $b$, of the shafts D, D, gear. In the upper part of the framing A, at each side of the saw C, and directly underneath the tracks or bolt frames E, E, adjustable planes H, are attached, said planes being adjusted in a position more or less inclined by means of set screws $h$. The upper surfaces of the planes H, adjoining the saw are inclined as shown clearly at $i$, in Fig. 1, and to the framing A at each end of the tracks or bolt frames E, a spring catch $j$, is attached as shown clearly in Fig. 1.

The operation is as follows:—In each carriage F, a bolt I, is placed. These bolts rest on the set planes H, until they are acted upon by the saw just previous to which they are grasped by the dogs G, and firmly held by the dogs while the shingles are being sawed therefrom. The carriages are moved back and forth simultaneously in opposite directions by the pinions $b$, $b$, and racks $g$, the pinions $b$, as previously stated having a rotating reciprocating movement given them by cross and direct belts, a shingle being cut from the bolt at each movement of the carriages. The bolts I, fit loosely on the carriages so that the inclined surfaces $i$, of the planes may incline the bolts and cause them to be presented to the saw in an oblique position in order that the shingles may be sawed therefrom in taper form, the dogs G being made to gripe the bolts at the proper time by means of the guides $f$, against which the ends of the springs $e$, bear just previous to the bolts reaching the saw. At the termination of the stroke or movement of each carriage F, each carriage actuates the spring $j$, before it and thereby causes its track E, to fall or tilt, the gravity of the carriage effecting the result when the spring is thrown out, and the spring $j$, at the opposite end passing under the track and keeping the opposite end elevated until the return movement of the carriages actuates it and causes it to descend. By this arrangement the bolts I, I, are relieved from the saw, all heating prevented and the saw is prevented from scratching or marring the work, and the necessity of setting the saw "raking" or in an oblique position with the plane of the movement of the bolt obviated. The springs $e$, of the dogs G, permit the dogs G, to accommodate themselves to varying sized bolts.

By referring to Fig. 1, it will be seen that an inclined surface for giving the inclination to the bolts is shown only on one set plane H. The reason of this is, that the other plane H, is inclined laterally instead of longitudinally, see Fig. 3,—the same result however is obtained in either case. The planes H, by means of the set screws $h$, are set, bodily more or less inclined with the saw C, their outer ends being lower than the inner ends adjoining the saw in order to counteract the tendency of the saw to work off from the bolt.

I am aware that the set planes H, or their equivalents have been previously used for inclining the bolts and causing the shingles to be sawed in taper form. I am also aware that self-adjusting or automatic dogs have been used. I therefore do not claim broadly and in themselves considered such devices; but,

Having thus described my invention what I do claim as new and desire to secure by Letters Patent, is,

1. The employment or use of two bolt carriages F, F, when used in connection with the adjustable planes H, and arranged in the relation with the circular saw C, as shown so that a shingle may be sawed from each bolt at each movement of its carriage and the two bolts operated upon simultaneously by one and the same saw.

2. The adjustable or tilting tracks or bolt frames E, E, in combination with the reciprocating carriages F, F, and saw C, the whole being arranged to operate substantially as and for the purpose set forth.

N. BOARDMAN.

Witnesses:
W. C. KELLOGG,
ALBERT W. PAINE.